US008271380B2

(12) United States Patent
VanDeburg et al.

(10) Patent No.: US 8,271,380 B2
(45) Date of Patent: Sep. 18, 2012

(54) DECENTRALIZED GUARANTEED STORED VALUE TRANSFER SYSTEM AND METHOD

(75) Inventors: Theodore VanDeburg, Denver, CO (US); David Baumgartner, Parker, CO (US); Kevin James, Waynesville, NC (US); Keith Newbrough, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 805 days.

(21) Appl. No.: 11/379,338

(22) Filed: Apr. 19, 2006

(65) Prior Publication Data

US 2007/0027802 A1    Feb. 1, 2007

Related U.S. Application Data

(63) Continuation-in-part of application No. 10/356,207, filed on Jan. 30, 2003, now Pat. No. 7,882,021.

(51) Int. Cl.
*G06Q 40/00*    (2006.01)

(52) U.S. Cl. ................ 705/39; 705/38; 705/40

(58) Field of Classification Search ............... 705/38–40
See application file for complete search history.

(56) References Cited

U.S. PATENT DOCUMENTS

| | | | |
|---|---|---|---|
| 4,528,643 A | 7/1985 | Freeny, Jr. | |
| 4,700,005 A | 10/1987 | Green | |
| 4,884,212 A | 11/1989 | Stutsman | |
| 5,146,067 A | 9/1992 | Sloan et al. | |
| 5,220,501 A | 6/1993 | Lawlor et al. | |
| 5,255,182 A | 10/1993 | Adams | |
| 5,352,876 A | 10/1994 | Watanabe et al. | |
| 5,440,108 A | 8/1995 | Tran et al. | |
| 5,471,669 A | 11/1995 | Lidman | |
| 5,477,038 A | 12/1995 | Levine et al. | |
| 5,504,808 A | 4/1996 | Hamrick, Jr. | |
| 5,511,114 A | 4/1996 | Stimson | |
| 5,513,117 A | 4/1996 | Small | |
| 5,557,516 A | 9/1996 | Hogan | |
| 5,592,400 A | 1/1997 | Sasou | |
| 5,637,845 A | 6/1997 | Kolls | |
| 5,678,010 A | 10/1997 | Pittenger et al. | |
| 5,721,768 A | 2/1998 | Stimson et al. | |
| 5,796,832 A | 8/1998 | Kawan | |
| 5,868,236 A | 2/1999 | Rademacher | |

(Continued)

OTHER PUBLICATIONS

Shrider, David G. (2003). Two essays in finance. Ph.D. dissertation, University of South Carolina, United States—South Carolina. Retrieved May 17, 2012, from ABI/INFORM Global.(Publication No. AAT 3098705).*

(Continued)

*Primary Examiner* — Jason Dunham
*Assistant Examiner* — Nancy Mehta
(74) *Attorney, Agent, or Firm* — Kilpatrick Townsend & Stockton LLP (57) ABSTRACT

System and methods for facilitating the settlement of financial accounts across different entities utilize a host computer system that tracks financial transactions made at each merchant location or store and uses this information to reconcile accounts across different entities. In one embodiment, for redemption transactions that occurred within one of the entities other than where the associated account was activated, the host computer system is configured to prepare a request to transfer a redemption amount to a central account from an entity account associated with where the account was activated, and to prepare a request to transfer less than the redemption amount from the central account to an entity account associated with where the redemption transaction occurred.

17 Claims, 5 Drawing Sheets

U.S. PATENT DOCUMENTS

| | | | |
|---|---|---|---|
| 5,872,844 A * | 2/1999 | Yacobi | 705/69 |
| 5,884,290 A * | 3/1999 | Smorodinsky et al. | 705/44 |
| 5,903,633 A | 5/1999 | Lorsch | |
| 5,936,221 A | 8/1999 | Corder et al. | |
| 5,984,181 A | 11/1999 | Kreft | |
| 5,987,438 A | 11/1999 | Nakano et al. | |
| 5,991,748 A | 11/1999 | Taskett | |
| 6,006,988 A | 12/1999 | Behrmann et al. | |
| 6,012,035 A * | 1/2000 | Freeman et al. | 705/2 |
| 6,064,990 A * | 5/2000 | Goldsmith | 705/75 |
| 6,129,275 A | 10/2000 | Urquhart et al. | |
| 6,169,975 B1 | 1/2001 | White et al. | |
| 6,193,155 B1 | 2/2001 | Walker et al. | |
| 6,269,345 B1 * | 7/2001 | Riboud | 705/35 |
| 6,295,522 B1 | 9/2001 | Boesch | |
| 6,298,336 B1 | 10/2001 | Davis et al. | |
| 6,324,523 B1 * | 11/2001 | Killeen et al. | 705/36 R |
| 6,405,182 B1 | 6/2002 | Cuervo | |
| 6,473,500 B1 | 10/2002 | Risaf et al. | |
| 6,510,983 B2 | 1/2003 | Horowitz et al. | |
| 6,516,302 B1 | 2/2003 | Deaton et al. | |
| 6,826,545 B2 * | 11/2004 | Kawashima et al. | 705/40 |
| 6,876,979 B2 * | 4/2005 | Ling | 705/26.41 |
| 6,901,387 B2 * | 5/2005 | Wells et al. | 705/64 |
| 7,099,844 B1 * | 8/2006 | Snijders et al. | 705/39 |
| 7,184,979 B1 * | 2/2007 | Carson | 705/35 |
| 2001/0018660 A1 | 8/2001 | Sehr | |
| 2001/0023409 A1 | 9/2001 | Keil | |
| 2001/0023415 A1 | 9/2001 | Keil | |
| 2001/0047342 A1 | 11/2001 | Cuervo | |
| 2002/0013728 A1 * | 1/2002 | Wilkman | 705/14 |
| 2002/0174016 A1 | 11/2002 | Cuervo | |
| 2003/0004870 A1 * | 1/2003 | Van Rensburg et al. | 705/39 |
| 2003/0053609 A1 | 3/2003 | Risafi et al. | |
| 2003/0110136 A1 * | 6/2003 | Wells et al. | 705/64 |
| 2003/0154163 A1 * | 8/2003 | Phillips et al. | 705/39 |
| 2004/0139004 A1 * | 7/2004 | Cohen et al. | 705/39 |
| 2006/0144926 A1 * | 7/2006 | Jacobs | 235/380 |

OTHER PUBLICATIONS

Jill Cataldo. (Dec. 30, 2009). Coupon Queen: Results vary when making item returns. The Island Packet. Retrieved May 17, 2012, from ProQuest Newsstand. (Document ID: 1930097281).*

U.S. Appl. No. 10/356,207, Office Action dated Oct. 17, 2007, 17 pages.

U.S. Appl. No. 10/356,207, Final Office Action dated May 6, 2008, 33 pages.

U.S. Appl. No. 10/356,207, Advisory Action dated Aug. 4, 2008, 3 pages.

* cited by examiner

DECENTRALIZED GUARANTEED STORED VALUE TRANSFER SYSTEM AND METHOD

CROSS REFERENCE TO RELATED APPLICATIONS

This application is a continuation in part application and claims priority from copending U.S. application Ser. No. 10/356,207, filed Jan. 30, 2003, the complete disclosure of which is herein incorporated by reference.

BACKGROUND OF THE INVENTION

This invention relates generally to the field of stored value accounts, and in particular to accounting practices relating to such accounts. More specifically, the invention relates to the management of stored value transactions that occur across multiple business entities.

Stored value accounts have gained widespread use in the United States, among other countries. Such stored value accounts are typically associated with a card having an account number, and are often referred to as "gift cards." These cards can often be purchased at a retail location for a special amount, e.g., $20. After paying for the card, the account number is read from the card, such as by using a mag stripe reader. The account number is transmitted to a database where the associated account is credited for $20. Each time a purchase is made, the account is debited by the purchase amount.

One issue that arises when using such cards to make purchases is how to account for transactions that occur across different business entities. Such situations may arise, for example, when merchants are franchised or have affiliate locations. For example, a franchised organization is often made up of various franchisees that independently own and operate their own store or groups of stores. Such franchisees typically utilize their own accounting systems. As such, if a customer purchases a gift card at one franchise location and then attempts to use the card to make a purchase at another franchise location that is separately owned and/or managed, there is no way to reconcile accounts between the two franchisees. As such, many franchise locations simply refuse to honor gift cards purchased at other locations, thereby reducing their attractiveness to consumers.

BRIEF SUMMARY OF THE INVENTION

The invention provides systems and methods for facilitating the settlement of financial accounts across different entities. The invention utilizes a host computer system that tracks financial transactions made at each merchant location or store and uses this information to reconcile accounts across different entities.

For example, in one embodiment the host computer periodically performs a net settlement analysis of the transactional data received from each entity's stores. A request is prepared to transfer funds from each entity's bank account having a positive net settlement amount into a central entity bank account. A request is also prepared to transfer funds into each entity's bank account having a negative net settlement amount from the central entity bank account.

The net settlement analysis may be performed by subtracting all negative adjustments from all positive adjustments that occurred within a certain time. Examples of negative adjustments include redemptions or purchases made at stores, and examples of positive adjustments include activations or reloads made at stores.

Conveniently, the request to transfer funds may be in the form of an ACH file. In this way, the host computer may send the file to the appropriate banks to transfer the funds to and from each entity's bank account.

The host computer system may comprise a transaction processor that processes incoming financial transaction data. For example, the transaction processor may process the data to activate new accounts, add value to an existing account, or maintain records of balances of existing accounts. The host computer may also have a settlement engine to perform the settlement analysis based on each of the entity's data.

The transaction processor may conveniently receive the transactional data from various point of sale devices that may be located within the stores. Also, various types of presentation instruments may be used to store customer account information that may be read by the point of sale devices.

In another embodiment, the host computer may settle the accounts by analyzing each of the transactions to determine the store in which the transaction originated. The host computer may also maintain a record of the transactions that occurred within entities other than where the associated customer account originated. For the transactions that occurred within one of the entities other than where the associated account originated, the host computer periodically prepares a request to transfer funds into or out from the bank accounts of the entities where the transactions occurred, and out from or into the bank accounts of the entities where the associated account originated, depending on whether the associated accounts are to be debited or credited.

For example, where the transactions comprise redemptions that occurred within the entities other than where the accounts originated, requests are periodically created to transfer funds into the bank accounts of the entities where the redemption transactions occurred and out of the bank accounts of the entities where the associated accounts originated.

As another example, for reload transactions that occurred within the entities other than where the associated accounts originated, requests are periodically prepared to transfer funds from the bank accounts of the entities where the reload transactions occurred and into the bank accounts of the entities where the associated accounts originated.

In a further embodiment, the invention provides systems and methods for settling financial accounts. According to such embodiments, a host computer system receives financial transaction data resulting from a plurality of financial transactions originating from a plurality of stores. These stores are grouped into separate entities with separate accounting systems. Also, the financial transactions are associated with customer accounts. At least some of the financial transactions are activation transactions where customer accounts are activated with an activation amount, and at least some of the financial transactions are redemption transactions for redemption amounts. Each financial transaction is analyzed to determine the entity from which the financial transaction originated. For redemption transactions that occur within one of the entities other than where the associated account was activated, a request is prepared to transfer a redemption amount to a central account from an entity account associated with where the account was activated. Also, a request is prepared to transfer less than the redemption amount from the central account to an entity account associated with where the redemption transaction occurred. Although the transferred amount is less than the redemption amount, the funds are guaranteed by the central account so that payments will always be made, even if the entity where the account was activated fails to pay. The transaction fee is collected by the central account to accommodate for the risk of non-payment.

At least some of the financial transactions may comprise reload transactions where funds are credited to the customer accounts. For the reload transactions that occurred within the entities other than where the associated accounts were activated, requests are prepared to transfer reload amounts from the accounts of the entities where the reload transactions occurred and into the central account. Also, requests are prepared to transfer from the central account to accounts of the entities where the associated accounts were activated amounts less than the transferred reload amounts. However, these funds are guaranteed by the central account.

In one aspect, the host computer system is configured to transfer less than the redemption amount from the central account to the entity account associated with where the account was activated regardless of whether the redemption amounts are transferred from the entity account associated with where the redemption transaction occurred. In another aspect, the requests to transfer each comprise an ACH file. Further, the host computer system may be configured to calculate a fee and to deduct the fee from the redemption amount. This fee may be a percentage of the redemption amount, a fixed fee or the like and serves to compensate the central entity for guaranteeing the payment.

DETAILED DESCRIPTION OF THE INVENTION

The invention provides for the settlement of financial accounts where the underlying financial transactions occur across multiple different entities. Although useful with essentially any type of financial accounts, the invention will find particular use with stored value accounts.

Such accounts typically have an associated identifier that may conveniently be stored on a presentation instrument, such as a card. Such presentation instruments may initially be in an inactive state where no value is associated with the presentation instrument. To associate a value with the account, a consumer may purchase one of the cards for a certain amount, such as fifty dollars. Conveniently, this transaction (referred to as an activation) may be processed at a merchant location. In such cases, the merchant collects a payment, using cash, credit card, debit card or any other acceptable form of payment, and enters this information into a point-of-sale device. The account identifier associated with the presentation instrument is also entered into the point-of-sale device. For example, the identifier may be stored on a magnetic stripe, on a bar code label, or the like. Examples of such point-of-sale devices that may be used to capture and/or transmit such information to a host computer system are described in copending U.S. application Ser. No. 10/116,619, filed Apr. 3, 2002, the complete disclosure which is herein incorporated by reference. However, it will be appreciated that the invention is not intended to be limited to a specific type of processing/reading device. For example, other ways of transmitting information include by telephone (such as by using an IVR system), by contacting a customer service representative or the like. Reload transactions, where value is added to an existing account, may occur in a similar manner.

Such information is transmitted to the host computer system which has a record of the account identifier. Such information may be transmitted across a variety of networks including telephone networks, credit card networks, wide area networks, the Internet, wireless networks, and the like. Further, depending on the type of processing device used to transmit the information, such devices may also be coupled to a financial network, such as a credit card or ATM network, or may have a direct connection to the host computer system. If connected to a financial network, the host computer system may be configured to determine that the transaction is related to a stored value account rather than a traditional credit or debit card and may process the information appropriately.

When such information is received at the host computer system, the value that was paid by the consumer is associated with the account identifier. In so doing, the account is activated so that the consumer may then use the presentation instrument for making a subsequent purchase.

To redeem part or all of the value associated with the presentation instrument (referred to as a redemption transaction), the consumer simply needs to provide the account identifier at the time of redemption. For example, if a consumer desired to purchase a video, the consumer may simply provide the presentation instrument to the clerk at the time of check out. The identifier may then be read from the presentation instrument using a point-of-sale device and transmitted back to the host computer system. Along with this information, a location of the transaction may also be transmitted. This may be entered and transmitted using any of the techniques previously described. The host computer system is configured to determine the amount of value remaining in the account and to debit the account by the transaction amount if sufficient value exists in the account. Further, information confirming the transaction may be transmitted back to the point-of-sale device.

Other information regarding the transaction that may be transmitted back to the point-of-sale device includes the amount debited, the new balance, and the like. This information may be displayed by the point-of-sale device and may optionally be printed to provide a paper receipt.

Consumers typically perform transactions, such as redemptions, activations, reloads and the like at merchant locations, such as stores, using the Internet or from some other type of network. These stores may be part of the same business entity or may be separate. For example, a bagel franchise may have stores in California that are owned and operated by one business entity, while the stores in Oregon are owned and operated by another business entity. When transactions are performed, they are transmitted to the host computer system for processing. The host computer system is also used to determine appropriate credits and debits to each entity's bank account based on certain criteria. Periodically, the host computer system may prepare requests to transfer funds into and out from the entities' bank accounts in accordance with the criteria.

For example, according to one scheme, each transaction is tracked to determine its location. The transaction location is compared with the entity where the associated account was activated (referred to as the originating entity). Based on the type of transaction and whether the transaction locations is within the originating entity, an entity's bank account may be credited or debited during the next reconciliation cycle.

As another example, a central bank account may be used to reconcile each entity's bank account. With such an embodiment, only the location where the transaction originated need be monitored. Periodically, each entity's bank account is brought to a zero balance by transfers to or from the central bank account based on whether the entity has a positive or a negative transaction total for a given period.

As a further example, a central entity may be used to guarantee payments between the different entities. In this way, if one entity goes bankrupt or is otherwise unable to pay, the central entity makes good on the transaction. To account for the risk of nonpayment, the central entity may receive a fee (which may be a portion of the transaction).

Figure 1A:
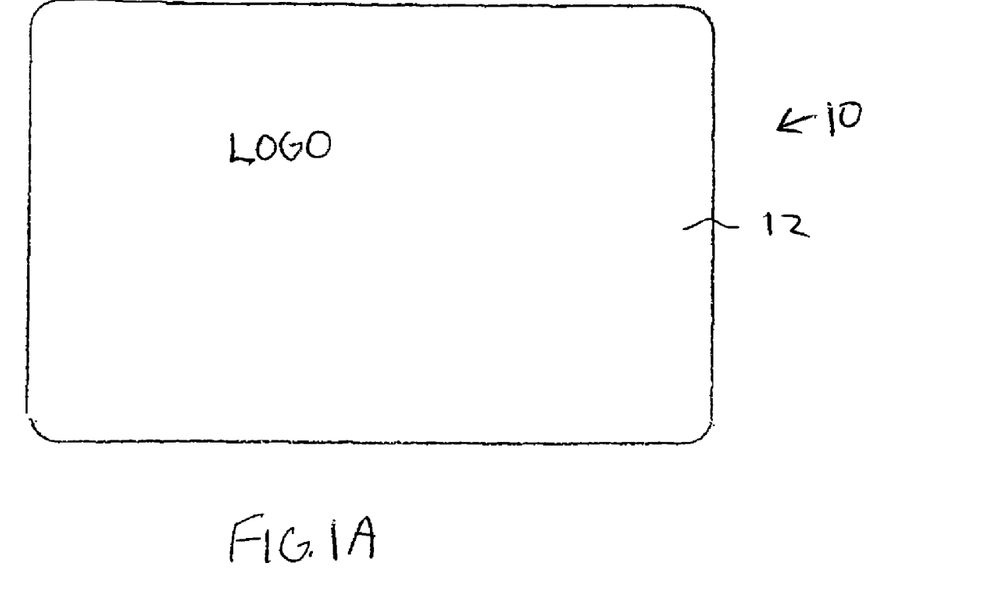
FIG. 1A is a front view of one embodiment of a presentation instrument that may be used in accordance with the invention.
Figure 1B:
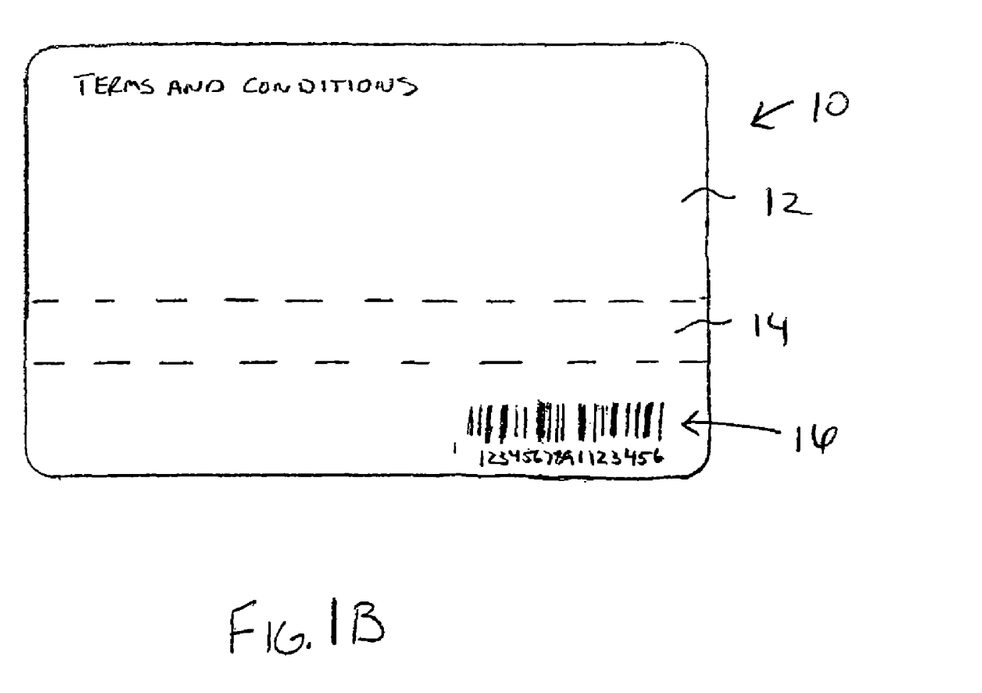
FIG. 1B is a rear view of the presentation instrument of FIG. 1A.

Referring now to FIGS. 1A and 1B, one embodiment of a presentation instrument 10 that may be used with the invention will be described. In general, the presentation instruments of the invention may be constructed of a wide variety of materials that are capable of storing an identifier that uniquely identifies the associated account. For example, the material may comprise a card 12 (that in turn may be constructed of plastic, cardstock, paper, or the like). Other materials include a computer disk (such as a CD, DVD or the like) or other tangible media. Further, the identifier may be stored in a variety of formats, such as in print, on magnetic media (such as a magnetic stripe 14), in a bar code format 16, in a computer processor (also known as a smart chip) or the like. Appropriate readers may be employed at the point-of-sale to read such formats and then transmit them to the host computer system for processing. Card 12 may also include merchant identification information, such as a name, logo, or the like.

Figure 2:
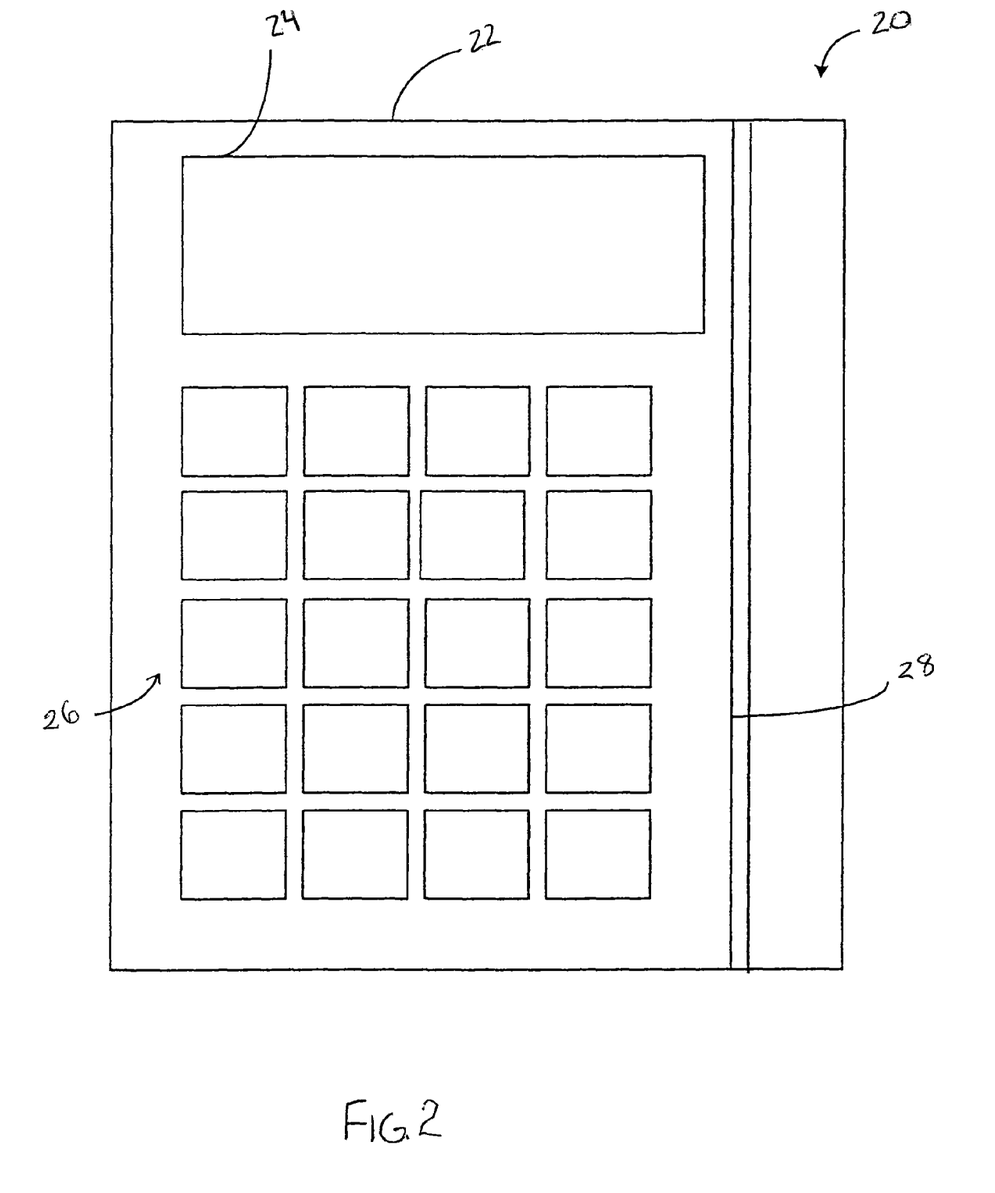
FIG. 2 is a schematic diagram of a point of sale device that may be used in accordance with the invention.

Referring now to FIG. 2, a point-of-sale device 20 that may be used will be described in greater detail. In so doing, it will be appreciated that the invention is not intended to be limited for use with only a specific type of point-of-sale device. Indeed, any type of processing or computing device that may transmit and receive data over a network may be used.

Point-of-sale device 20 comprises a housing 22 having a display screen 24 and input devices 26. Conveniently, input device 26 may comprise keys or buttons that may be depressed to enter information into a point-of-sale device 14. Input devices 26 may each be associated with one or more letters or other alpha numeric characters, or may operate as function keys.

Point-of-sale device 14 also includes a reader 28 that may be used to read information from mag stripe 14 of presentation instrument 10. Alternatively, reader 28 may be configured to read a variety of other formats such as bar code labels, smart chips, and the like in a manner similar to that previously described.

Figure 3:
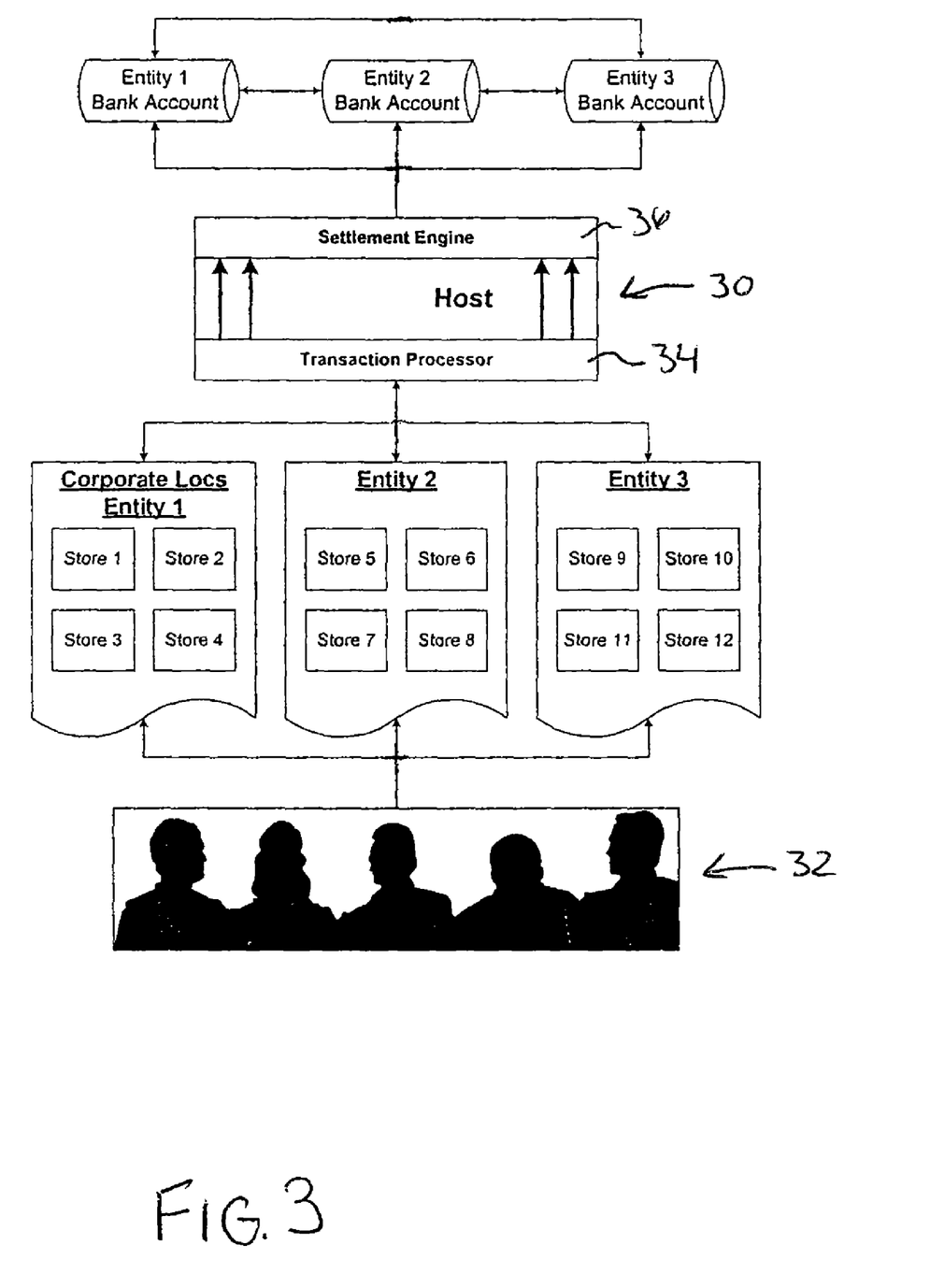
FIG. 3 is a schematic diagram illustrating both a system and a method for settling accounts across multiple entities according to the invention.
Figure 4:
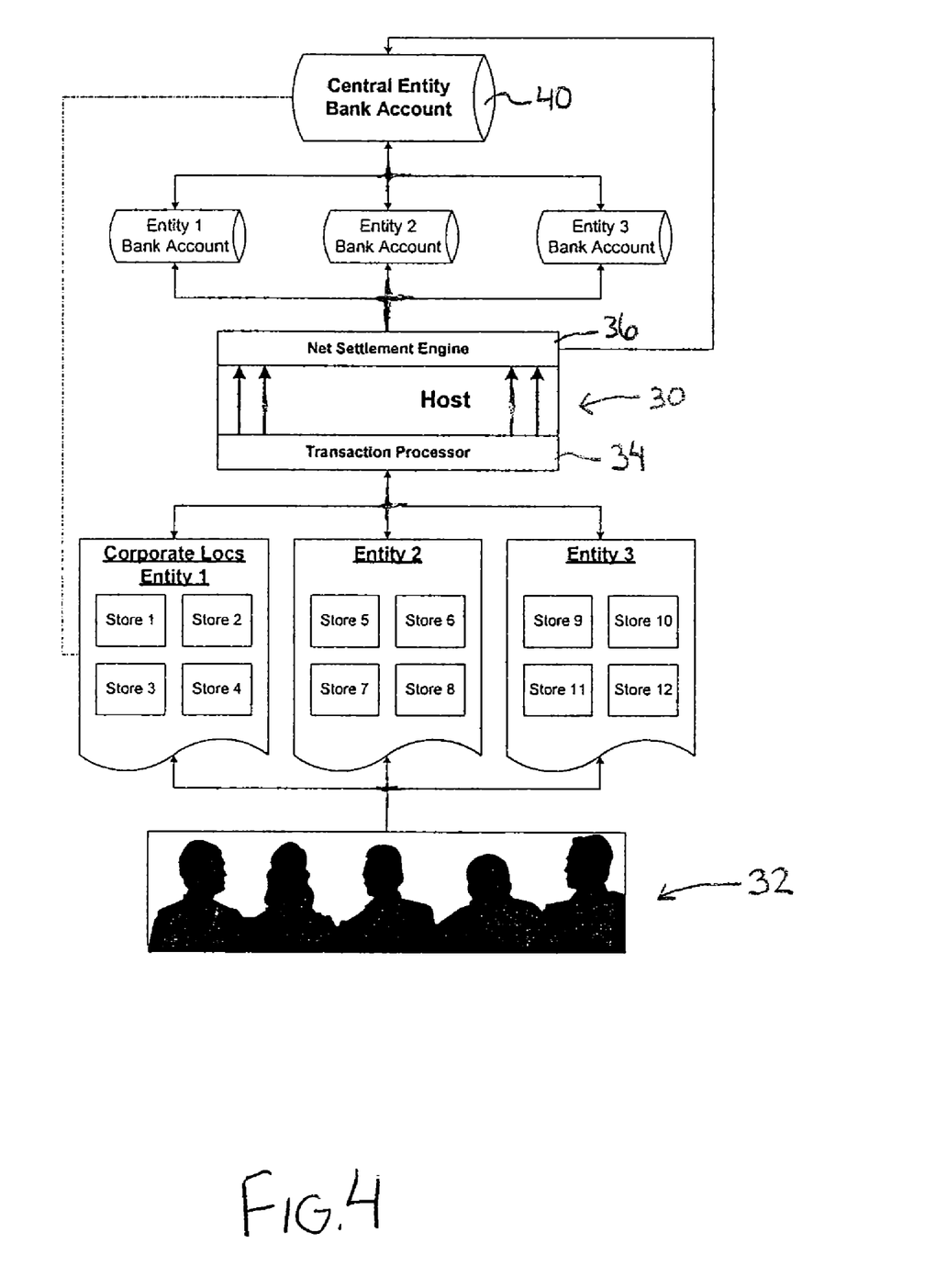
FIG. 4 is a schematic diagram illustrating another system and method for settling accounts across multiple entities according to the invention.

Referring to FIGS. 3 and 4, two embodiments of systems and methods that may be used to reconcile accounts across multiple entities will be described. Both embodiments utilize a host computer system 30. A wide variety of information may be stored in computer system 30. Such information may include, for example, account identifiers that uniquely identify each account. Other information that may be associated with each account identifier includes an opening balance, an originating entity, an existing balance, transaction amounts associated with each transaction, including debits to the account, redemption locations, redemption times, redemption amounts, local or transactional currencies used for various transactions for each entity's bank account, exchange rates used in converting currencies, entities for each of the locations, bank account information, and the like. Such a host computer system may be configured as a server computer with an associated database, as a mainframe computer, or the like. One example of such a host computer system is the one utilized by IPS Card Solutions, a division of First Data Corp.

Transactions originate from consumers 32 that may use presentation instruments (such as described in connection with FIG. 1) that are read using point of sale devices (such as described in connection with FIG. 2). To perform a transaction (such as an activation, a redemption or a reload) a consumer 32 proceeds to a store (or other transaction location) that can originate the transaction. As shown in FIG. 3, each store is part of a business entity. For convenience of illustration, the stores are consecutively numbered as Stores 1-12 and the business entities are labeled as Entities 1-3. In so doing, it will be appreciated that the invention may be used with other numbers of entities and stores, as well as the number of stores within a particular entity.

According to the invention, consumers may perform transactions in a single store, in multiple stores and/or within stores of multiple entities. The transaction information from such transactions is transmitted from the point of sale device in each store to host computer 30 where they are processed using a transaction processor 34. The results produced by host computer 30 are transmitted back to the point of sale device where the transaction originated so that the transaction may be completed.

Host computer 30 also performs an analysis of each transaction to determine if the transaction occurred within the entity where the account was originally activated (referred to as the originating entity), or outside of the originating entity. A settlement engine 36 keeps a running total (for each entity) of those transactions that occurred outside of the originating entity. This data is used to generate ACH fund transfers required for a specified time period to reconcile the accounts for each entity. Such reconciliation time periods may be essentially any time, such as hourly, daily, weekly, monthly and the like. Entities 1-3 each have a corresponding bank account, which are respectively referred to as Entity Bank Accounts 1-3.

As an example (as illustrated in FIG. 3), for redemption transactions that occur outside of an originating entity, the originating entity may receive a debit. For reloads occurring outside an originating entity, the originating entity may receive a credit. Hence, when a customer activates an account with a certain beginning value, that amount is credited to the specific customer account using host 30 and to the originating entity's bank account. If the consumer makes a redemption with the originating entity, host computer 30 simply debits the consumer's account by the redemption amount and makes a corresponding debit to the originating entity's bank account. For reloads that occur within the originating entity, the consumer's account is credited by the reload amount, and the originating entity's account is also credited.

However, if a redemption is made outside of the originating entity (e.g., Entity 3), the originating entity (e.g., Entity 1) will at some time send a transfer to the redemption entity bank account (e.g., from Entity 1 Bank Account to Entity 3 Bank Account) for the amount of the redemption. Conversely, for reloads made outside of the originating entity (e.g., Entity 3), the originating entity (e.g., Entity 1) will at some time receive a transfer of funds from the reloading entity (e.g., from Entity 3 Bank Account to Entity 1 Bank Account). Settlement engine 36 is configured to periodically perform such reconciliations, and creates ACH files for the funds transfers between the bank accounts. Such a model thus creates the potential for a fund transfer between each entity. For example, a DDA Authorization Form may be required from each entity bank account to the bank accounts of all other entities. For instance, for 10 entities, up to 100 authorization forms may be required.

The embodiment of FIG. 4 utilizes a central bank account 40 to manage the settlement process. With the embodiment of FIG. 4, it is not necessary to track whether a redemption or a reload occurred at an entity other than an originating entity. Rather, on a periodic basis, settlement engine 36 is used to perform a net settlement analysis of all transactional data for each entity. The settlement analysis subtracts all negative adjustments occurring within the entity, (i.e. redemptions) from all positive adjustments (i.e. activations and reloads) occurring within the entity. Such a process may occur hourly, daily, weekly, monthly and the like.

If an entity's (e.g., Entity 1) net settlement amount is positive, (e.g., the activation and reload amounts exceed the redemption amounts), the settlement engine 36 prepares an ACH file for a fund transfer from the entity's bank account (e.g., Entity 1 Bank Account) to the central entity bank account 40. For negative net settlement amounts (where the redemption amounts exceed the activation and reload amounts for a given entity), settlement engine 40 prepares an ACH file for a fund transfer from the central entity bank account 40 to the entity's bank account. Hence, funds are transferred to and from central entity bank account 40 as required to zero balance each entity's bank account at the time of net settlement.

Figure 5:
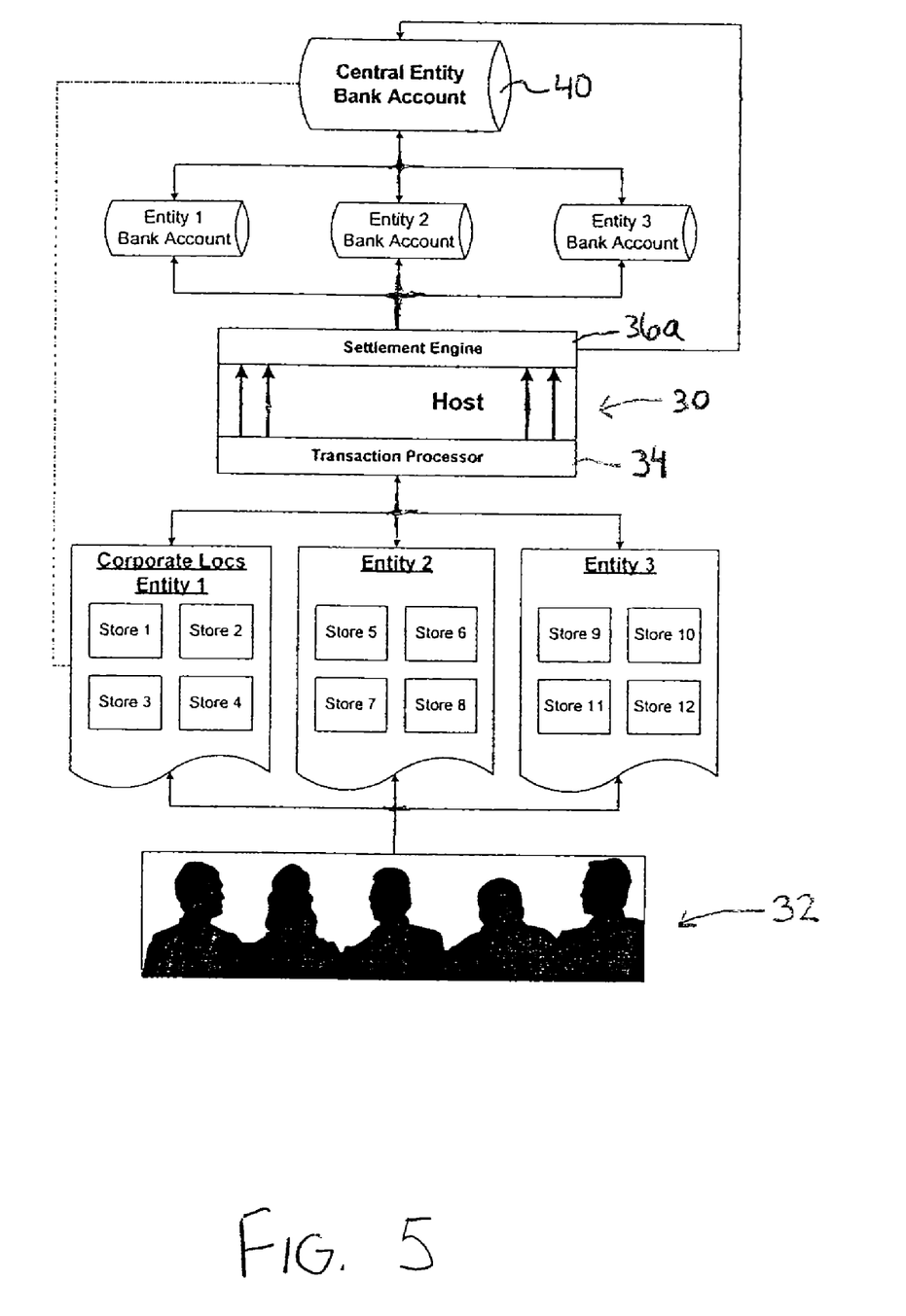
FIG. 5 is a schematic diagram illustrating a further system and method for settling accounts across multiple entities according to the invention.

The embodiment of FIG. 5 is similar to the embodiment of FIG. 4 except that settlement engine 36 is configured differently. Hence, FIG. 5 will use the same reference numerals as in FIG. 4 except that settlement engine will use reference numeral 36a. In the embodiment of FIG. 5, settlement is a hybrid between a centralized model and a decentralized model. More specifically, the location of a transaction is tracked, especially to determine whether the particular transaction occurred at an entity other than an originating entity. In real time, near real time or in batch mode, funds are moved through the central account to the entity account where the funds should be credited. Hence, such a system may utilize a centralized bank account to facilitate funds transfers between different entities. Such a process enables the activating merchant to retain the stored value funds until redemption. However, the funds are also guaranteed by the central entity so that the redeeming merchant is guaranteed payment even if the other entity goes out of business or into bankruptcy. To accommodate for the increased risk, the central entity may take a portion of each transaction as payment, or otherwise charge a fee for participation in the settlement program.

For example, a customer may purchase a presentation instrument in a store in entity #1 and load $20 into the account. These funds are deposited in a bank account of entity #1. Later, a customer may make a purchase of $5 in a store associated with entity #3. Using engine 36a, the central bank account 40 may be configured to perform various ACH transactions to withdraw $5 from the bank account of entity #1 which is deposited in the central bank account 40. The central bank account 40 transmits a portion of the redemption amount to the bank account of entity #3. This payment is a guaranteed payment, regardless of whether funds are successfully obtained from entity #1. To accommodate for this risk, the central entity 40 keeps a portion of the transaction, which can be a set amount, a portion of the transaction amount, or the like. In lieu of taking a portion of the transaction, the central entity could simply charge a fee.

As one example, the central entity 40 may transmit $4.50 to the bank account of entity #3 and keep $0.50 as a transaction fee. In this way, each entity is guaranteed payment, less a transaction fee. Also, the payment may be made at or near real time, such as in a daily batch process, or at other times.

EXAMPLES

One specific example of settlement processes that may occur using the embodiments described in FIGS. 3 and 4 will now be described in reference to Tables 1-3. Table 1 sets forth the various transactions that occur within different stores and different entities. Tables 2A and 2C illustrate the accounts as they would appear using the embodiment of FIG. 3. As shown in Table 2A, a reload is a positive value for the entity where the reload occurred, regardless of whether the entity was originating or non-originating. For redemptions, the value is negative. Hence, as shown in Table 2B, when the accounts are reconciled, all non-originating transactions (e.g. redemptions and reloads) will involve funds transfers between the originating entity bank accounts. Redemptions require a funds transfer into the bank account entity where the redemption was made, while reloads require a funds transfer to the originating bank account. FIG. 2C illustrates the bank accounts following reconciliation. Alternatively, reloads could be credited to the entity where the reloads occurred so that no funds transfers would be required.

TABLE 1

Transactions

| Customer # | Entity 1 | Entity 2 | Entity 3 |
|---|---|---|---|
| 1 | $20 A, SN1 | −$8 RD, SN6 $20 RL, SN5 | −$12 RD, SN10 |
| 2 | −$10 RD, SN2 | $30 A, SN6 −$20 RD, SN7 | |
| 3 | −$10 RD, SN4 | −$20 RD, SN5 | $50 A, SN12 −$10 RD, SN12 −5 RD, SN11 |

SN = Store Number
A = Activation
RD = Redemption
RL = Reload

TABLE 2A

Account Summary Before Reconciliation
(Decentralized Embodiment)

| Transaction | Entity 1 | Entity 2 | Entity 3 |
|---|---|---|---|
| Activations | $20 | $30 | $50 |
| Reloads by Originating Entity | | | |
| Reloads by Non-Originating Entity | | $20 | |
| Redemptions by Originating Entity | | −$20 | −$15 |
| Redemptions by Non-Originating Entity | −$20 | −$28 | −$12 |
| | 0 | $2 | $23 |

TABLE 2B

Cash Flows During Reconciliation

| Entity 1 | Entity 2 | Entity 3 |
|---|---|---|
| $10 from Entity 2, RD | $8 from Entity 1, RD | $12 from Entity 1, RD |
| $10 from Entity 3, RD | $20 from Entity 3, RD | |
| $20 from Entity 2, RL | | |

TABLE 2C

Account Summary After Reconciliation

|  | Entity 1 | Entity 2 | Entity 3 |
|---|---|---|---|
| Beginning Balance | 0 | $2 | $23 |
|  | $10 RD | −$10 RD |  |
|  | $10 RD |  | −$10 RD |
|  | $20 RL |  | −$20 RL |
|  | −$8 RD | $8 RD |  |
|  |  | $20 RD | −$20 RD |
|  | −$12 RD |  | $12 RD |
| Ending Balance | $20 | 0 | $5 |

Table 3 below illustrates how the transactions of Table 1 are reconciled using the embodiment of FIG. 4. As shown, each entity's bank account is brought to a zero balance, with Entity 2 Bank Account transferring $2 to central entity bank account 40 and Entity 3 Bank Account transferring $23 to central entity bank account 40.

TABLE 3

Account Summary After Reconciliation
(Centralized Embodiment)

|  | Entity 1 | Entity 2 | Entity 3 |
|---|---|---|---|
| Beginning Balance | 0 | $2 | $23 |
| Ending Balance | 0 | 0 | 0 |

Tables 4A through 4D illustrate one specific example of a settlement process that may occur using the decentralized guaranteed payment embodiment of FIG. 5. In so doing, the transactions set forth in Table 1 above will be used. As shown in Table 4A, the account summary prior to reconciliation is the same as set forth in the decentralized model of Table 2A. Where the embodiment of FIG. 5 differs is in the way cash flows proceed during reconciliation. As shown below in Table 4B, cash flow are similar to those shown in Table 2B, except that a transaction fee for each transaction (in the amount of $1) is withdrawn and credited to the central bank account. As shown in table 4C, the resulting accounts for each of the entities is slightly less than those in Table 2C because of the transaction fees. As a result of these fees, the central account makes $6.

In Table 4D, however, entity 2 goes bankrupt prior to reconciliation. Because of this, the central bank is required to guarantee payments (less the transaction fee) to entities 1 and 3 (and possibly even to entity 2). As a result, entities 1 and 3 each have the same ending balance as in Table 4C. Entity 2 which is in bankruptcy still receives funds. Any disbursements from entity 2 will need to be determined based on the outcome of the bankruptcy proceedings. However, the central bank which has guaranteed all payments, now shows an ending balance which is far less than the scenario set forth in Table 4C. Of course, a risk model may be developed to help insure that the central account charges sufficient fees to compensate for the risk of default by another entity so that the central account will stay a going concern.

TABLE 4A

Account Summary Before Reconciliation
(Decentralized Guaranteed Embodiment)

| Transaction | Entity 1 | Entity 2 | Entity 3 |
|---|---|---|---|
| Activations | $20 | $30 | $50 |
| Reloads by Originating Entity |  |  |  |
| Reloads by Non-Originating Entity |  | $20 |  |
| Redemptions by Originating Entity |  | −$20 | −$15 |
| Redemptions by Non-Originating Entity | −$20 | −$28 | −$12 |
|  | 0 | $2 | $23 |

TABLE 4B

Cash Flows During Reconciliation

| Entity 1 | Entity 2 | Entity 3 |
|---|---|---|
| $9 from Entity 2, RD | $7 from Entity 1, RD | $11 from Entity 1, RD |
| $9 from Entity 3, RD | $19 from Entity 3, RD |  |
| $19 from Entity 2, RL |  |  |

TABLE 4C

Account Summary After Reconciliation

|  | Entity 1 | Entity 2 | Entity 3 | Central |
|---|---|---|---|---|
| Beginning Balance | 0 | $2 | $23 | $100 |
|  | $9 RD | −$10 RD |  | $1 |
|  | $9 RD |  | −$10 RD | $1 |
|  | $19 RL | −$20 RL |  | $1 |
|  | −$8 RD | $7 RD |  | $1 |
|  |  | $19 RD | −$20 RD | $1 |
|  | −$12 RD |  | $11 RD | $1 |
| Ending Balance | $17 | −$2 | $4 | $106 |

TABLE 4D

Account Summary After Reconciliation (Entity 2 goes bankrupt)

|  | Entity 1 | Entity 2 | Entity 3 | Central |
|---|---|---|---|---|
| Beginning Balance | 0 | $2 | $23 | $100 |
|  | $9 RD | BANKRUPT |  | −$9 |
|  | $9 RD |  | −$10 RD | $1 |
|  | $19 RL | BANKRUPT |  | −$19 |
|  | −$8 RD | $7 RD (TRUST) |  | $1 |
|  |  | $19 RD (TRUST) | −$20 RD | $1 |
|  | −$12 RD |  | $11 RD | $1 |
| Ending Balance | $17 | (TBD) | $4 | $76 |

The invention has now been described in detail for purposes of clarity and understanding. However, it will be appreciated that certain changes and modifications may be practiced within the scope of the appended claims.

What is claimed is:

1. A method for settling financial accounts, the method comprising:
   receiving at a host computer system financial transaction data resulting from a plurality of financial transactions originating from a plurality of stores, wherein the stores are grouped into separate entities with separate accounting systems, wherein the financial transactions are associated with customer accounts, wherein at least some of the financial transactions are activation transactions where customer accounts are activated with an activation amount, and wherein at least some of the financial transactions are redemption transactions for redemption amounts;

analyzing, with the host computer system, each financial transaction to determine the entity from which the financial transaction originated;

maintaining, at the host computer system, a record of the financial transactions, including from which entity the financial transaction originated; and for redemption transactions that occurred within one of the entities other than where the associated account was activated, preparing, with the host computer system, a request to transfer a redemption amount to a central account from an entity account associated with where the account was activated, and preparing, with the host computer system, a request to transfer less than the redemption amount from the central account to an entity account associated with where the redemption transaction occurred.

2. A method as in claim 1, wherein at least some of the financial transactions comprise reload transactions where funds are credited to the customer accounts, and for the reload transactions that occurred within the entities other than where the associated accounts were activated, preparing, with the host computer system, requests to transfer reload amounts from the accounts of the entities where the reload transactions occurred and into the central account, and preparing, with the host computer system, requests to transfer from the central account to accounts of the entities where the associated accounts were activated amounts less than the transferred reload amounts.

3. A method as in claim 1, further comprising analyzing, with the host computer system, the redemption transactions at the host computer to determine whether the customer accounts contain sufficient funds to cover the redemption transactions.

4. A method as in claim 1, further comprising transmitting from the host computer system to the stores responses to the requested redemptions.

5. A method as in claim 1, wherein the requests to transfer each comprise an ACH file.

6. A method as in claim 1, wherein the host computer system is configured to transfer less than the redemption amount from the central account to the entity account associated with where the redemption transaction occurred regardless of whether the redemption amounts are transferred from the entity account associated with where the account was activated.

7. A method as in claim 1, wherein the host computer system is configured to calculate a fee and to deduct the fee from the redemption amount, and wherein the fee is selected from a group consisting of a percentage of the redemption amount and a fixed fee.

8. A financial transaction settlement system, comprising:

a transaction processor that is configured to receive and process financial transaction data resulting from a plurality of financial transactions that originate from a plurality of stores that are grouped into separate entities, wherein the transaction processor is configured to process the transactional data to activate new customer accounts and to maintain records on current balances for the customer accounts;

a settlement engine that is configured to analyze each financial transaction to determine the entity from which the financial transaction originated, to maintain a record of the financial transactions that occurred with entities where the associated customer accounts originated, and for a redemption transactions that occurs within one of the entities other than where the associated account originated, preparing a request to transfer funds out from the bank account of the entity where the associated account originated and into a central bank account, and preparing a request to transfer from the central bank account into the bank account of the entity where the redemption transaction occurred an amount that is less than a redemption amount.

9. A system as in claim 8, wherein at least some of the financial transactions comprise reload transactions where funds are credited to the customer accounts, and for the reload transactions that occur within the entities other than where the associated accounts originated, the settlement engine is configured to prepare requests to transfer funds from the bank accounts of the entities where the reload transactions occurred and into the central bank account, and to prepare requests to transfer less than any reload amounts from the central bank account and into the bank accounts of the entities where the associated accounts originated.

10. A system as in claim 8, wherein the transaction processor is further configured to analyze the redemption transactions at the host computer to determine whether the customer accounts contain sufficient funds to cover the redemption transactions.

11. A system as in claim 8, further comprising a plurality of point of sale devices that are located within the stores for transmitting to the transactional processor the transactional data.

12. A system as in claim 8, further comprising a plurality of customer presentation instruments containing customer account information that is readable by the point of sale devices.

13. A system as in claim 8, wherein the host computer system is configured to transmit to the stores responses to the requested redemptions.

14. A system as in claim 8, wherein the requests to transfer each comprise an ACH file.

15. A system as in claim 8, wherein the host computer system is configured to transfer less than the redemption amount from the central account to the entity account associated with where the redemption transaction occurred regardless of whether the redemption amount is transferred from the entity account associated with where the account originated.

16. A system as in claim 8, wherein the host computer system is configured to calculate a fee and to deduct the fee from the redemption amount, and wherein the fee is selected from a group consisting of a percentage of the redemption amount and a fixed fee.

17. A method for settling financial gift card accounts, the method comprising:

receiving at a host computer system financial transaction data resulting from a plurality of financial transactions originating from a plurality of stores, wherein the financial transaction data relate to stored value gift cards, wherein the stores are grouped into separate entities with separate accounting systems, wherein the financial transactions are associated with customer accounts, wherein at least some of the financial transactions are activation transactions where customer accounts are activated with an activation amount which is to be added to the stored value, and wherein at least some of the financial transactions are redemption transactions for redemption amounts which are to be subtracted from the stored value;

analyzing, with the host computer system, each financial transaction to determine the entity from which the financial transaction originated;

maintaining, at the host computer system, a record of the financial transactions, including from which entity the financial transaction originated; and for redemption transactions that occurred within one of the entities other than where the associated account was activated, preparing, with the host computer system, a request to transfer a redemption amount to a central account from an entity account associated with where the account was activated, and preparing, with the host computer system, a request to transfer less than the redemption amount from the central account to an entity account associated with where the redemption transaction occurred.

* * * * *